US011601376B2

(12) United States Patent
Johns et al.

(10) Patent No.: US 11,601,376 B2
(45) Date of Patent: Mar. 7, 2023

(54) NETWORK CONNECTION HANDOFF

(71) Applicant: Comcast Cable Communications, LLC, Philadelphia, PA (US)

(72) Inventors: Kevin Johns, Erie, CO (US); Allen Broome, Broomfield, CO (US); Eric Rosenfeld, Denver, CO (US); Richard Fliam, Greenwood Village, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 682 days.

(21) Appl. No.: 13/828,372

(22) Filed: Mar. 14, 2013

(65) Prior Publication Data
US 2014/0280747 A1 Sep. 18, 2014

(51) Int. Cl.
*H04L 47/70* (2022.01)
*H04L 67/1097* (2022.01)

(52) U.S. Cl.
CPC .......... *H04L 47/70* (2013.01); *H04L 67/1097* (2013.01)

(58) Field of Classification Search
CPC ..... H04L 47/70; H04L 67/2842; H04L 67/10; H04L 67/327; H04L 67/1097; G06Q 30/00; G06F 17/00
See application file for complete search history.

(56) References Cited

U.S. PATENT DOCUMENTS

| | | | | |
|---|---|---|---|---|
| 6,269,390 B1* | 7/2001 | Boland | ................. | G06F 9/4881 711/120 |
| 8,909,736 B1* | 12/2014 | Bosch | ................... | H04L 65/612 709/217 |
| 9,094,464 B1* | 7/2015 | Scharber | ................. | H04L 69/14 |
| 9,246,819 B1* | 1/2016 | Thirasuttakorn | ..... | H04L 47/125 |
| 2009/0204682 A1* | 8/2009 | Jeyaseelan | .......... | H04L 67/2842 709/217 |
| 2010/0302939 A1* | 12/2010 | Denis | .................. | H04L 43/0882 370/230 |
| 2011/0071841 A1* | 3/2011 | Fomenko | ............ | G06F 16/1834 705/1.1 |
| 2012/0036180 A1* | 2/2012 | Thornton et al. | ............. | 709/203 |
| 2012/0150945 A1* | 6/2012 | Tcha | .................... | H04L 67/1074 709/203 |
| 2012/0239725 A1* | 9/2012 | Hartrick | ................ | H04L 69/163 709/203 |

(Continued)

OTHER PUBLICATIONS

Wikipedia; "Distributed Computing"; Sep. 17, 2012; https://web.archive.org/web/20120917114050/https://en.wikipedia.org/wiki/Distributed_computing (Year: 2012).*

(Continued)

*Primary Examiner* — Glenton B Burgess
*Assistant Examiner* — Jihad K Boustany
(74) *Attorney, Agent, or Firm* — Banner & Witcoff, Ltd.

(57) ABSTRACT

Systems, methods, apparatuses, and computer readable media may be configured for transferring of state data of a network connection established by a first device. In an example, a front end device of a cache cluster may establish a network connection with a client device and generate state data associated with the network connection. The front end device may receive a content request from the client device via the network connection and select one of a plurality of back end devices to provide the content item.

20 Claims, 8 Drawing Sheets

(56) References Cited

U.S. PATENT DOCUMENTS

2014/0172944 A1\* 6/2014 Newton .............. H04L 41/0869
709/202

OTHER PUBLICATIONS

Aron et al., Scalable Content-Aware Request Distribution in Cluster-Based Network Servers, 2000, USENIX Association (Year: 2000).\*
Aron et al., Efficient Support for P-HTTP in Cluster-Based Web Servers, 1999, USENIX Association (Year: 1999).\*

\* cited by examiner

NETWORK CONNECTION HANDOFF

BACKGROUND

A typical Content Distribution Network (CDN) attempts to properly route client requests for content to a caching node that can provide the requested content. Domain Name Systems (DNS) and Hypertext Transfer Protocol (HTTP) are two known mechanisms for routing client requests. A DNS routes requests to a closest cluster of cache nodes or a least loaded caching node for providing the requested content. DNS, however, does not determine the type of content being requested, and hence the CDN cannot guarantee a client request is routed to a caching node having the requested content. This results in delays as a request may have to be re-routed to another caching node that has the requested content.

HTTP is another mechanism for handling client requests. Using HTTP, a client sends an HTTP request identifying the requested content to a content router. The content router then determines which cache node is to service the HTTP request and returns an HTTP redirect which tells the client to re-send the content request to another HTTP server. HTTP therefore uses redirects to identify a more precise route as compared DNS. HTTP redirects, however, add delay. Additionally, for long lived services like fragmented video, once the client has been redirected, if a cache node providing the content subsequently fails or the route to the cache node is disrupted, there is no opportunity to redirect the client to another cache node for uninterrupted service.

Current solutions, therefore, are inefficient and can be improved.

SUMMARY

The following presents a simplified summary in order to provide a basic understanding of some aspects as described herein. The summary is not an extensive overview of all aspects. It is neither intended to identify key or critical elements nor to delineate the scope of the present disclosure. The following summary merely presents various example concepts in a simplified form as a prelude to the more detailed description below.

In some embodiments, systems, methods, apparatuses, and computer readable media may be configured for handoff of a network connection between devices of a cache cluster.

In some aspects, state data of a network connection established by a first device of a cache cluster may be transferred to permit a second device of the cache cluster to provide a content item requested by a client device using the established network connection. In an example, a front end device of a cache cluster may establish a network connection with a client device and generate state data associated with the network connection. The front end device may receive a content request from the client device via the network connection and select one of a plurality of back end devices to provide the content item. The front end device may transfer the state data and the content request to the selected back end device with instruction to provide a requested content item to the client device.

In some additional aspects, systems, methods, apparatuses, and computer readable media may be configured for transferring of state data of a network connection established by a first device of a cache cluster to permit a second device of the cache cluster to provide a content item requested by a client device using the established network connection. In an example, a back end device of a cache cluster may establish a network connection with a client device and generate state data associated with the network connection. The back end device may receive a content request from the client device via the network connection and communicate the content request to a front end device of the cache cluster. The back end device may receive a network address of a selected one of the plurality of back end devices from the front end device. The back end device may transfer the state data of the network connection to the selected back end device along with an instruction to rely upon the state data at least in part when responding to the content request via the network connection.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Figure 1:
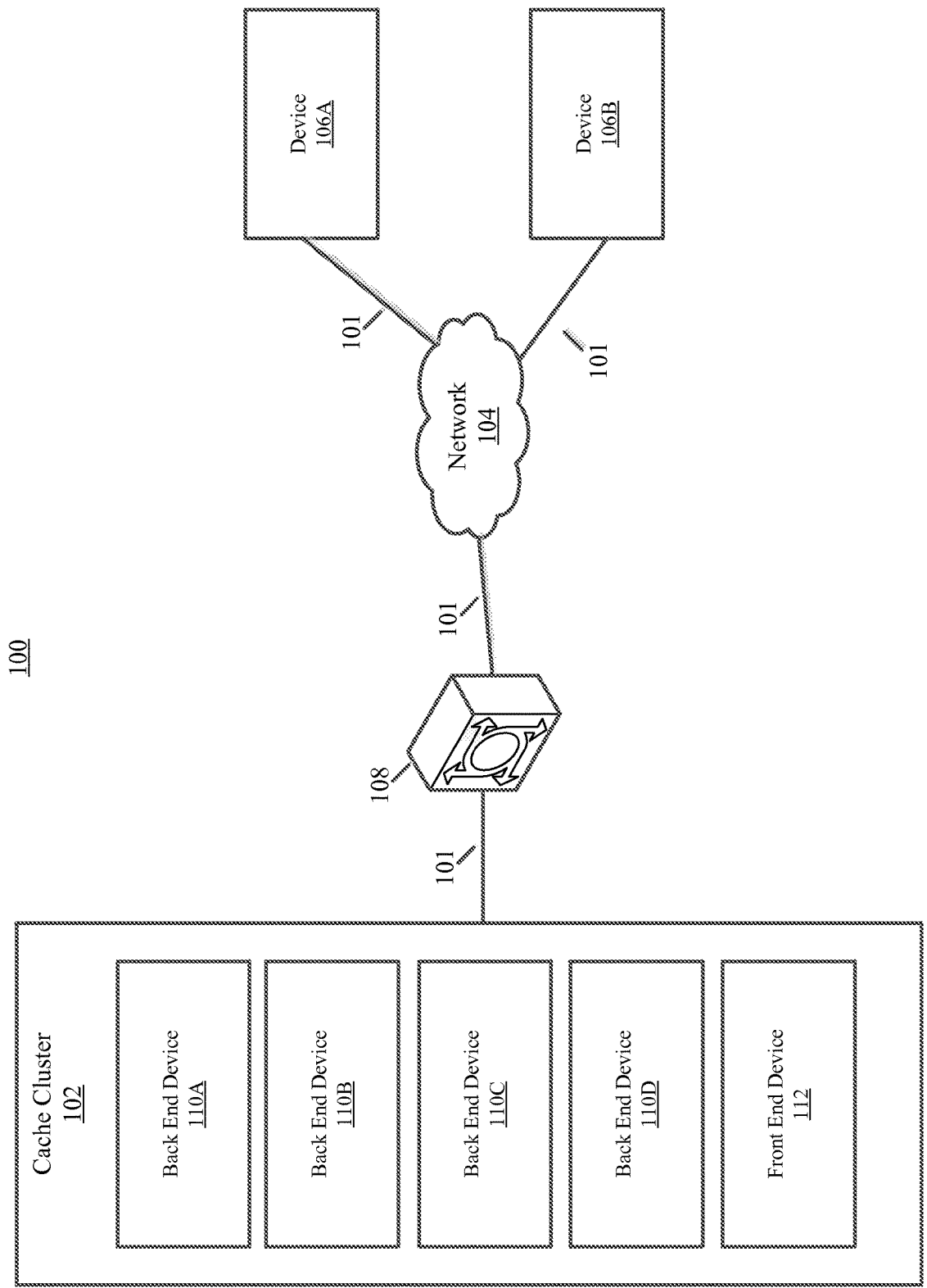
FIG. 1 illustrates an example network environment in accordance with example embodiments.

FIG. 1 illustrates an example content distribution system 100 in which many of the various features described herein may be implemented. The illustrated content distribution network is only one example of a network and is not intended to suggest any limitation as to the scope of use or functionality of the disclosure. The illustrated network should not be interpreted as having any dependency or requirement relating to any component or combination of components in a content distribution network.

System 100 may be a telecommunications network, a multi-service operator (MSO) network, a cable television (CATV) network, a cellular network, a wireless network, an optical fiber network, a coaxial cable network, a hybrid fiber-coaxial (HFC) network, a combination thereof, or any other type of content distribution network or combination of networks. For example, system 100 may be a cellular broadband network communicating with multiple access points. In another example, system 100 may be a coaxial system comprising a cable modem termination system (CMTS) communicating with numerous gateway interface devices. In another example, system 100 may be a fiber-optic system comprising optical fibers extending from an optical line terminal (OLT) to numerous optical network terminals (ONTs) communicatively coupled with various gateway interface devices. In another example, system 100 may be a digital subscriber line (DSL) system that includes a local office communicating with numerous gateway interface devices. In another example, system 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

System 100 may use a series of interconnected communication links 101 (e.g., coaxial cables, optical fibers, wireless links, etc.) to connect a cache cluster 102 to one or more client devices 106A-B via network 104. Communication links 101 may include any wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other components for communicating data. Data may include, for example, internet data, voice data, weather data, content, and any other information. Content may include, for example, video content, audio content, media on demand, video on demand, streaming video, television programs, text listings, graphics, advertisements, and other content. A content item may represent an individual piece of media content, such as a particular movie, television episode, online video clip, song, audio recording, image, or any other data. In some instances, a content item may be fragmented into segments, such as a plurality of two-second video fragments that may be separately addressed and retrieved.

Network 104 may include, for example, one or more telecommunications networks, Internet Protocol networks, cellular communications networks (e.g., Global System for Mobile Communications (GSM), Code Division Multiple Access (CDMA), and any other 2nd, 3rd, 4th and higher generation cellular communications networks), cellular broadband networks, radio access networks, fiber-optic networks, local wireless networks (e.g., Wi-Fi, WiMAX), satellite networks, and any other networks or combinations of networks. In an example, network 104 may include one or more routers 108.

Client devices 106A-B may include, for example, a television, set-top box, personal computer, laptop computer, wireless device (e.g., a wireless laptop, a tablet computer, a mobile phone, a portable gaming device), vehicular computing system (e.g., a mobile computing system, navigation system, or entertainment system in an automobile, marine vessel, or aircraft) and any other device. Although only two client devices are depicted, system 100 may include as many client devices as desired. In some aspects, client devices 106A-B may connect to network 104 via a network interface device. For example, device 106 may be coupled to a coaxial cable modem (for coaxial cable links 101), a broadband modem (for DSL links 101), a fiber interface node (for fiber-optic links 101), or any other device or combination of devices. In certain implementations, device 106 may be a part of, or communicatively coupled to, a gateway interface device. Gateway may be, for example, a wireless router, a set-top box, a computer server, or any other computing device or combination. A gateway may be any computing device for allowing one or more other devices in, for example, a user's home or other building, to communicate with network 104 or other devices communicatively coupled thereto.

Cache cluster 102 may include multiple devices for providing content items to the client devices 106A-B. Cache cluster 102 may include a front end device 112 coordinating multiple back end devices 110A-D that provide content items to the client devices. In an example, front end device 112 may be a content router that also operates as a domain name system (DNS) server. Each of the back end devices 110A-D may be a webserver or other device configured for providing content items. In one example, a back end device may be an edge cache.

Figure 2:
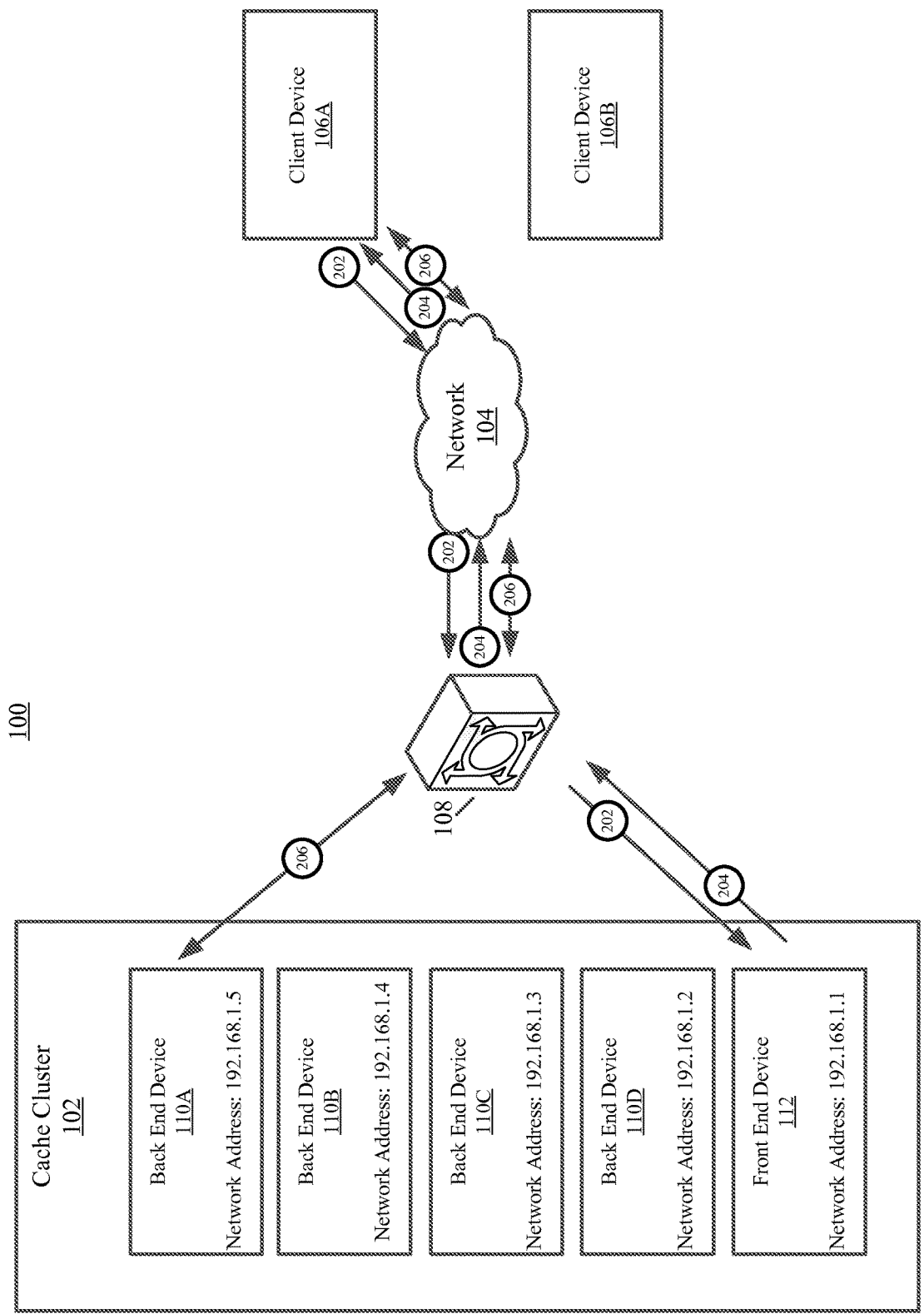
FIG. 2 illustrates example aspects of a flow diagram for obtaining a network address of a back end device of a cache cluster to obtain a content item, in accordance with example embodiments.

To facilitate responding to requests for content, cache cluster 102 may share state data of a network connection established with client device 106 among multiple devices so that any of the devices may respond to a content request. In an example, the state data may be state data of a network connection established using transmission control protocol. FIG. 2 illustrates example aspects of a signal flow diagram for obtaining a network address of a back end device of a cache cluster to obtain a content item, in accordance with example embodiments. In an example, client device 106A may communicate an address resolution request 202 via network 104 to router 108 to obtain a network address for the cache cluster 102. Address resolution request 202 may include a domain name of a website (e.g., lsrv1.img-xcal.com). Router 108 may forward request 202 to the front end 112, which may handle all such requests for cache cluster 102. Front end 112 may operate as a dispatcher to direct requests from client device 106A to a particular back end device 110 for responding with the requested content.

Front end 112 may select a selected one of the back end devices 110A-D to service request 202 based on loading data and information derived from request 202. In an example, back end devices 110A-D may periodically provide utilization information to indicate loading. Front end 112 may select the least loaded back end device, for example, for responding to the request 202. In another example, front end 112 may determine which of the back end devices 110A-D handles requests of the type found in request 202. For instance, back end devices 110A-D may be assigned to process requests associated with particular domain names (e.g., example1domain.com, example2domain.com, and so forth). Front end 112 may reply to address resolution request 202 with a network address reply 204 including a network address of a particular back end device 110. The network address may be, for example, an internet protocol (IP) address (e.g., 192.168.1.5). Router 108 may receive and forward reply 204 to client device 106A.

Client device 106A may use the network address included in reply 204 for requesting establishment of a network connection with the particular back end device 110 (e.g., device 110A). In an example, the network connection may be a Transmission Control Protocol (TCP) connection. Client device 106A may then use the established network connection to request at least one content item.

Figure 3:
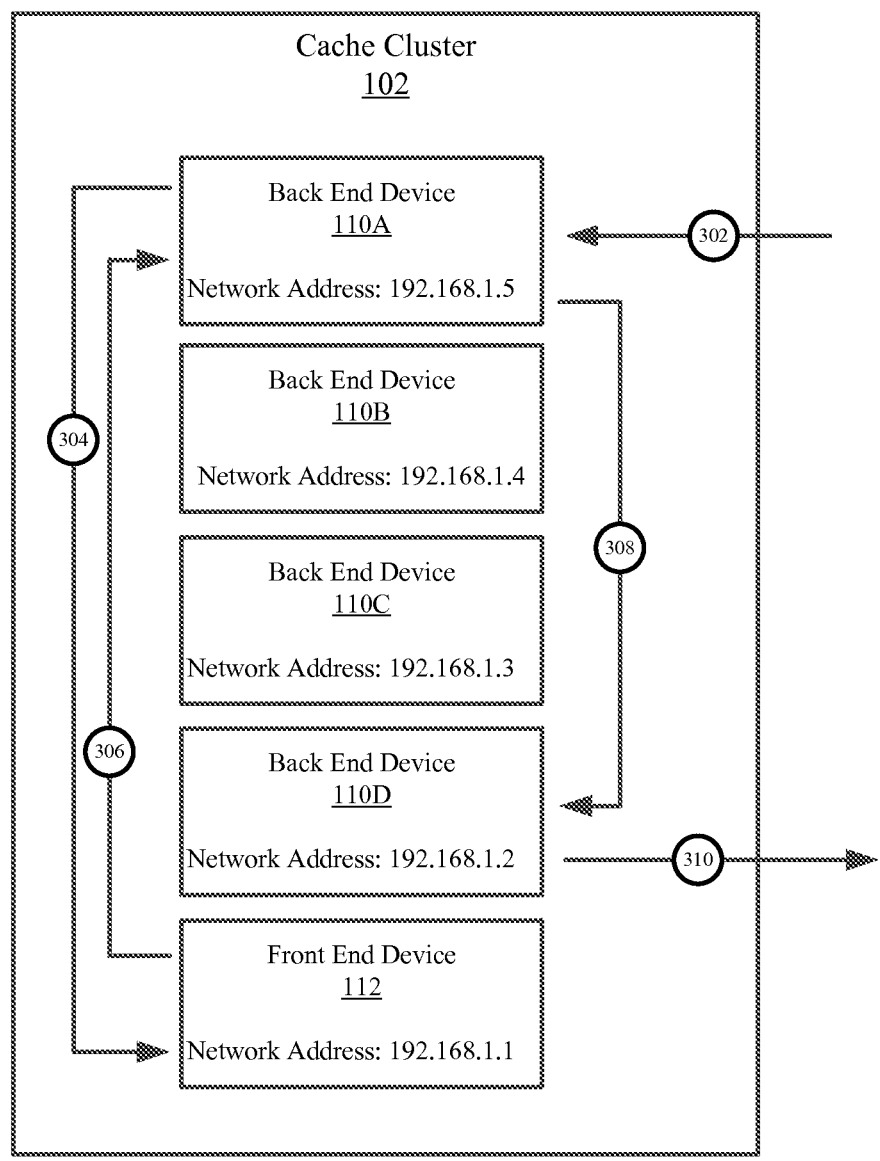
FIG. 3 illustrates an example of transferring state data in accordance with an example embodiment.

State data of the network connection may be shared between back end devices 110A-D to permit any of the back end devices 110A-D to provide the requested content item. FIG. 3 illustrates an example of transferring state data of a network connection between back end devices in accordance with an example embodiment. Once a network connection is established with back end 110A, client device 106A may communicate a content request 302 to back end 110A via the established network connection to request a content item. The content request 302 may include a network address of back end 110A (e.g., 192.168.1.5) and include a command having a content identifier. The command may be, for example, an HTTP request (e.g., GET command)) and the content identifier may be, for example, a uniform resource locator (URL) (e.g., HTTP://irsv1.img-xcal.com/ . . . /img-file001). Each of back ends 110A-D may store network addresses for the other back ends 110 to permit communication there between.

In element 304, back end 110A may extract and forward the content identifier to front end 112. Front end 112 may determine which back end 110A-D is to service the content request 302, and may, in element 306, return to back end 110A a network address of a particular back end 110 (e.g., back end 110D). In element 308, back end 110A may forward the command and the content identifier, as well as state data on the network connection established between back end 110A and client device 106A, to back end 110D. Back end 110D may determine a content item associated with the content identifier is locally stored in a storage device of back end 110D, or at some other location. If stored at some other location, back end 110D may request the content item and locally store the content item in its storage device. For any future requests of that content item, front end 112 may direct those requests to back end 110D. In element 310, back end 110A may deliver one or more messages including a payload containing the requested content to the client 106A via the network connection using the state data. For example, the payload may be imgfile001. Thus, state data of the network connection may be shared to permit back end device 110D, or any of the other back end devices 110B-C, to provide requested content via the network connection established between back end device 110A and client device 106A.

Figure 4:
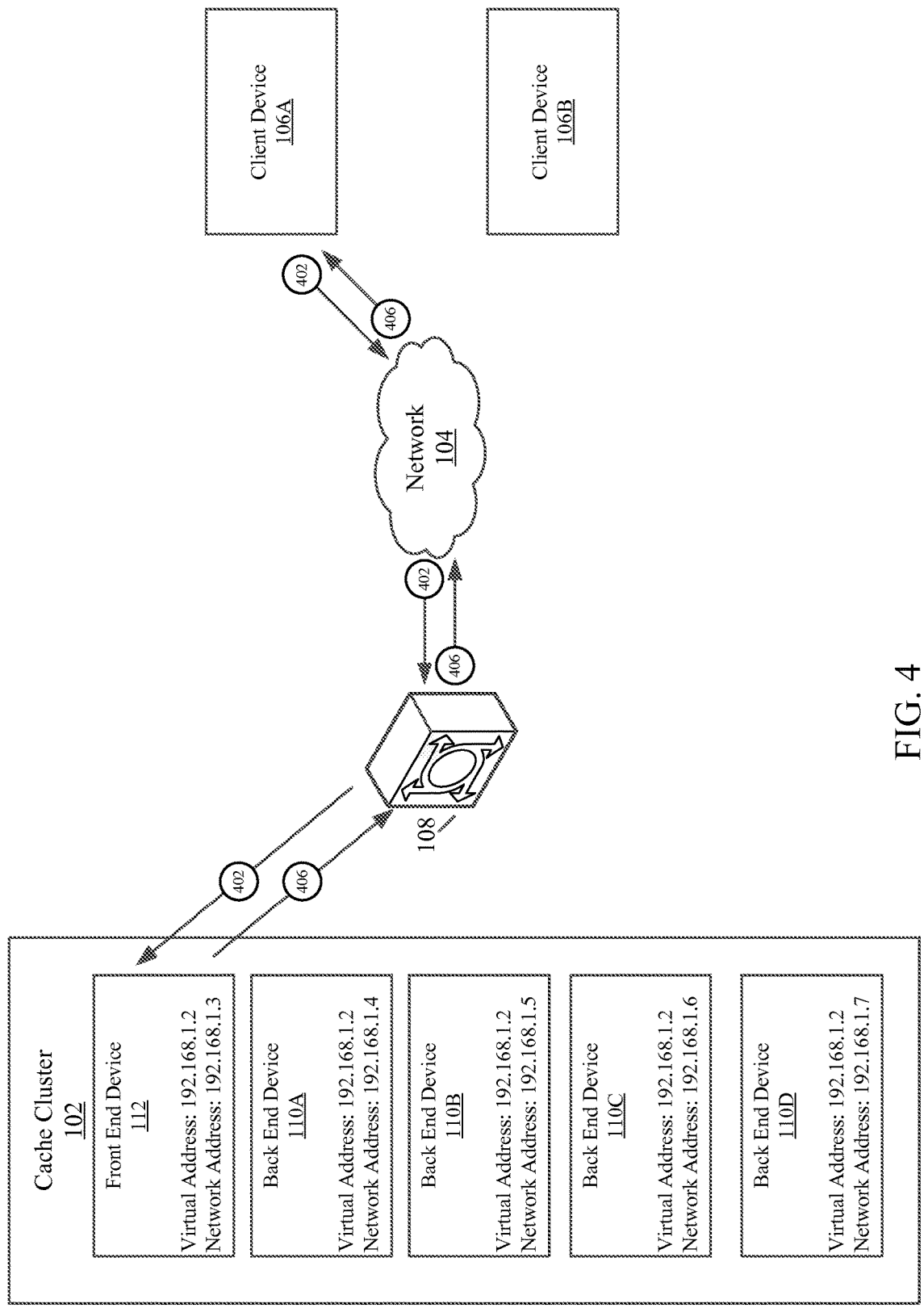
FIG. 4 illustrates example aspects of a flow diagram for obtaining a network address in accordance with example embodiments.

In another example, cache cluster 102 may establish a network connection using a virtual address and state data on the network connection may be transferred to permit one or more devices of the cache cluster 102 to respond to content requests via the established network connection. For example, client device 106A may establish a network connection with front end 112 instead of with a particular back end 110, as described below with reference to FIG. 4. In an example, client device 106A may communicate an address resolution request 402 via network 104 to router 108. Router 108 may have a default route pointing to front end 112, and may forward request 402 to front end 112. For example, router 108 may include a physical network address (e.g., IP address) of the front end 112, as opposed to a virtual network address. With reference to element 406 and in reply to request 402, front end 112 may establish a network connection (e.g., TCP connection) with the client device 106A. State data of the established network connection may list a virtual network address of the cache cluster 102, instead of a physical network address of any particular device within the cache cluster 102.

Figure 5:
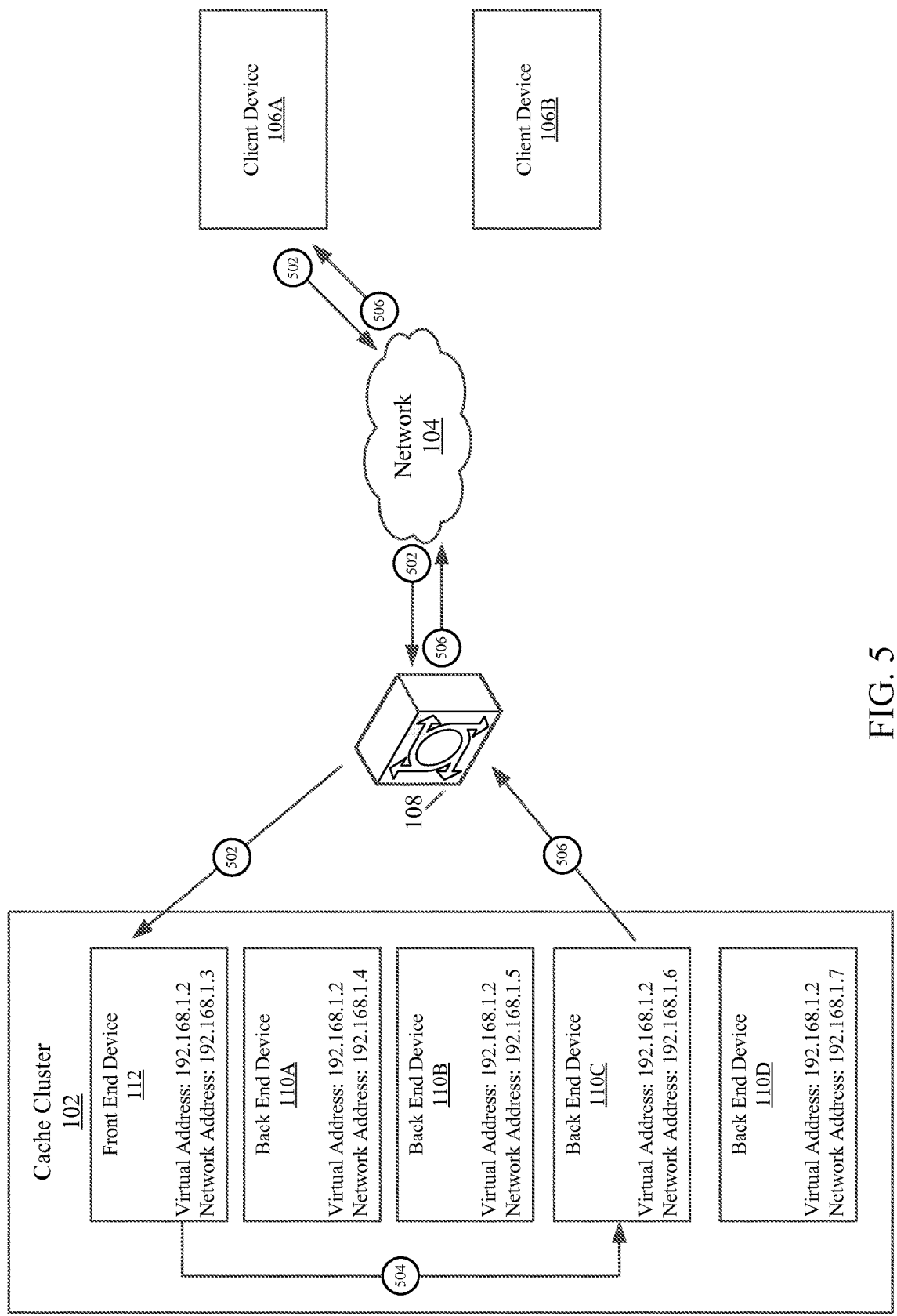
FIG. 5 illustrates an example diagram requesting a content item in accordance with example embodiments.

Client device 106A may use the established network connection to request content from the cache cluster 102. FIG. 5 illustrates an example of a signaling diagram for requesting a content item in accordance with example embodiments. Client device 106A may communicate a content request 502 to front end 112 via the established network connection. Content request 502 may include the virtual network address (e.g., 192.168.1.2) and a command having a content identifier (e.g., GET HTTP://CR.vid-xcal.com/ . . . /manifest). The command may be, for example, an HTTP request and the content identifier may be, for example, a uniform resource locator (URL). In an example, communications received by router 108 having the virtual address may be routed to front end 112.

Front end 112 may process the content request 502, inspect the content identifier, and assign a particular one of the back ends 110A-D to service the request. For example, front end 112 may select a particular back end device based on loading data and information derived from request 502, as described above. Front end 112 may then forward state data of the network connection established with the client device 106A to the assigned back end 110 (e.g., back end 110C). Back end 110C may then rely upon, consider, or use the transferred state data and respond to the client using the virtual network address and the established network connection. The consideration may be based on network rules, switch settings, etc. Similar to the description provided above, back end 110C may determine whether the content item is locally stored and retrieve the content item if not locally stored. Back end 110C may then forward the content item to client device 106A. For example, back end 110C may communicate a message 506 having a payload containing the requested file (e.g., payload: manifest file). The message 506 may be, for example, a 201 Created Message identifying a virtual network address (e.g., 192.168.1.6) and including the payload. Router 108 may forward the message 506 to the client device 106A via network 104. As such, cache cluster 102 may establish a network connection using a virtual address and state data on the virtual connection may be transferred to permit one or more devices of the cache cluster 102 to respond to content requests via the established network connection.

Figure 6:
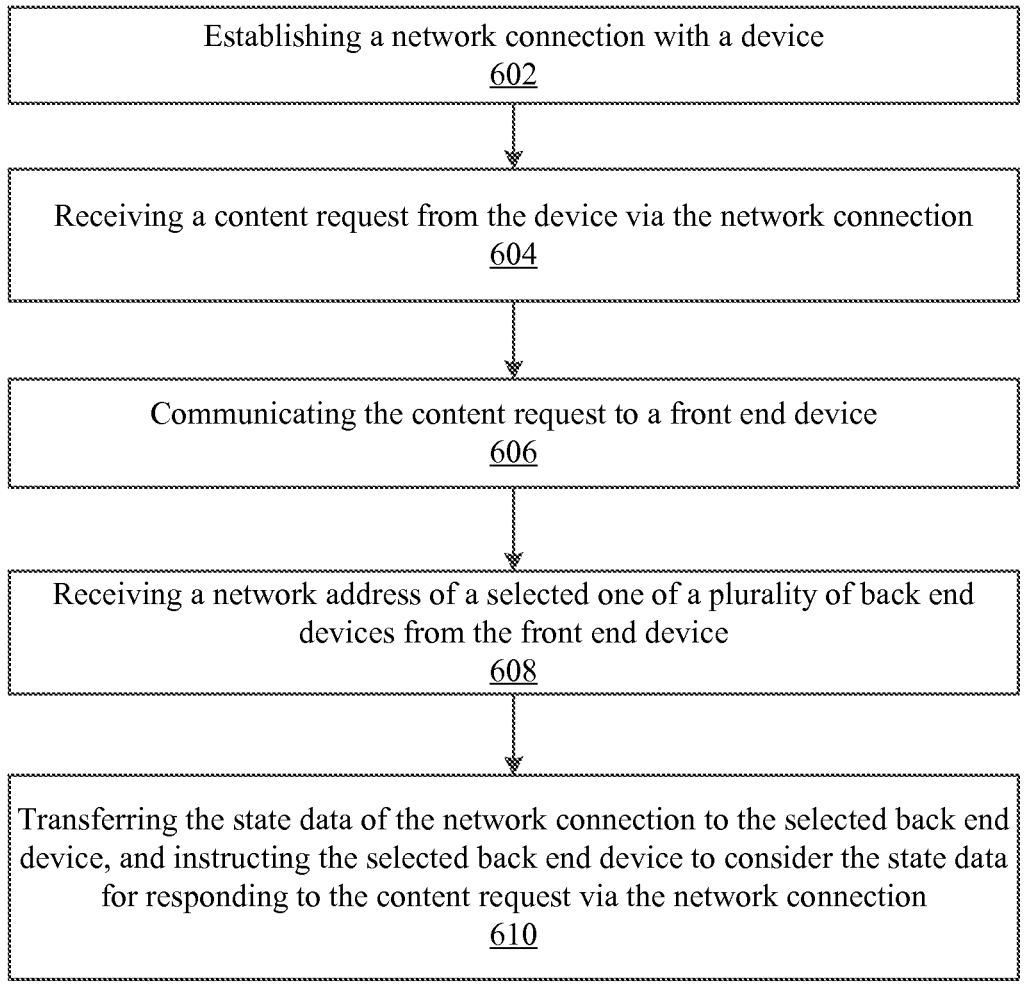
FIG. 6 illustrates a flow diagram of an example method in accordance with example embodiments of the disclosure.

FIG. 6 illustrates a flow diagram of an example method of a first device establishing a network connection and forwarding state data of the connection to a second device for providing a content item requested by a client device, in accordance with example embodiments of the disclosure. FIG. 6 may be implemented by a computer, such as, for example, back end device 110, or other apparatus, computer, server, wireless device, etc. The order of the steps shown in FIG. 6 may also be rearranged, additional steps may be included, some steps may be removed, and some steps may be repeated one or more times. The method may be stored on at least one non-transitory computer readable medium as computer executable instructions that, when executed by at least processor, cause an apparatus to perform the method. The method may begin at block 602.

At block 602, the method may include establishing a connection with a client device. In an example, a client device 106 (e.g., device 106A) may communicate an address resolution request to a front end device 112 of a cache cluster 102. The front end device 112 may communicate a network address of a particular back end device 110 (e.g. back end device 110A) within cache cluster 102 to the client device 106A. Using the network address, the client device 106A may communicate a connection request to the back end device 110A. Back end device 110A may then establish a network connection with client device 106A. Back end device 110A may also generate state date for the network connection.

At block 604, the method may include receiving a content request from the client device via the connection. In an example, back end device 110A may receive a request for a content item from client device 106A via the established network connection.

At block 606, the method may include communicating the content request to a front end device. In an example, back end device 110A may forward the content request to a front end device 112 for selecting which of the back end devices 110A-D is to service the request.

At block 608, the method may include receiving a network address of a selected one of a plurality of back end devices from the front end device. In an example, front end device 112 may select a particular one of the back end devices 110 to provide the requested content. Front end device 112 may inform the back end device 110A of a network address of the selected back end device (e.g., device 110D) for forwarding of state data on the established network connection to the selected back end device.

At block 610, the method may include transferring the state data of the connection to the selected back end device and instructing the selected back end device to use the connection for responding to the content request. In an example, back end device 110A may transfer state data of the established connection with the client device 106A to back end device 110D, and may instruct back end device 110D to respond to the content request. Back end device 110D may then determine whether the requested content item is stored locally. If stored locally, back end device 110D may retrieve the locally stored content item and provide the content item to the client device 106A. If not stored locally, back end device 110D may retrieve the content item for local storage. Back end device 110D may then provide the content item to the client device 106A. The method may then end, or may return to any of the preceding blocks, and the method, as well as each block, may repeat one or more times.

Figure 7:
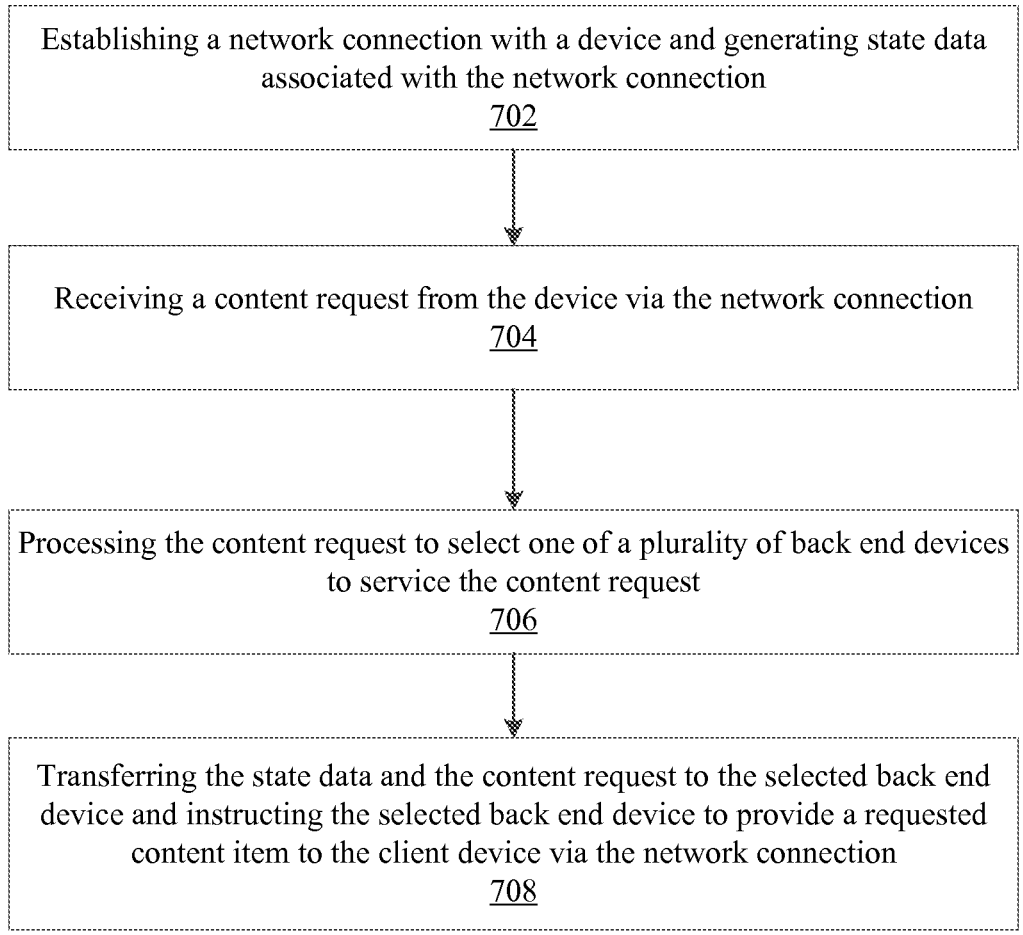
FIG. 7 illustrates a flow diagram of an example method in accordance with example embodiments of the disclosure.

FIG. 7 illustrates a flow diagram of an example method of a first device establishing a network connection and forwarding state data of the connection to a second device for providing content requested by a client device, in accordance with example embodiments of the disclosure. FIG. 7 may be implemented by a computer, such as, for example, front end device 112, or other apparatus, computer, server, wireless device, etc. The order of the steps shown in FIG. 7 may also be rearranged, additional steps may be included, some steps may be removed, and some steps may be repeated one or more times. The method may be stored on at least one non-transitory computer readable medium as computer executable instructions that, when executed by at least processor, cause an apparatus to perform the method. The method may begin at block 702.

At block 702, the method may include establishing a network connection with a client device and generating state data associated with the network connection. In an example, a front end device 112 may establish a network connection with a client device 106 (e.g., device 106A) and may generate state data associated with the network connection.

At block 704, the method may include receiving a content request from the client device via the network connection. In an example, front end 112 may receive a content request from the client device 106A via the network connection, wherein the content request identifies a content item to be provided.

At block 706, the method may include processing the content request to select one of a plurality of back end devices to service the content request. In an example, front end 112 may process the content request to determine which of back end devices 110A-D may provide the requested content item.

At block 708, the method may include transferring the state data and the content request to the selected back end device and instructing the selected back end device to provide a requested content item to the client device. In an example, front end 112 may transfer the state data of the network connection and the content request to the selected back end (e.g., back end 110C) and may instruct back end 110C to provide the requested content item to client device 106A. The method may then end, or may return to any of the preceding blocks, and the method, as well as each block, may repeat one or more times.

Figure 8:
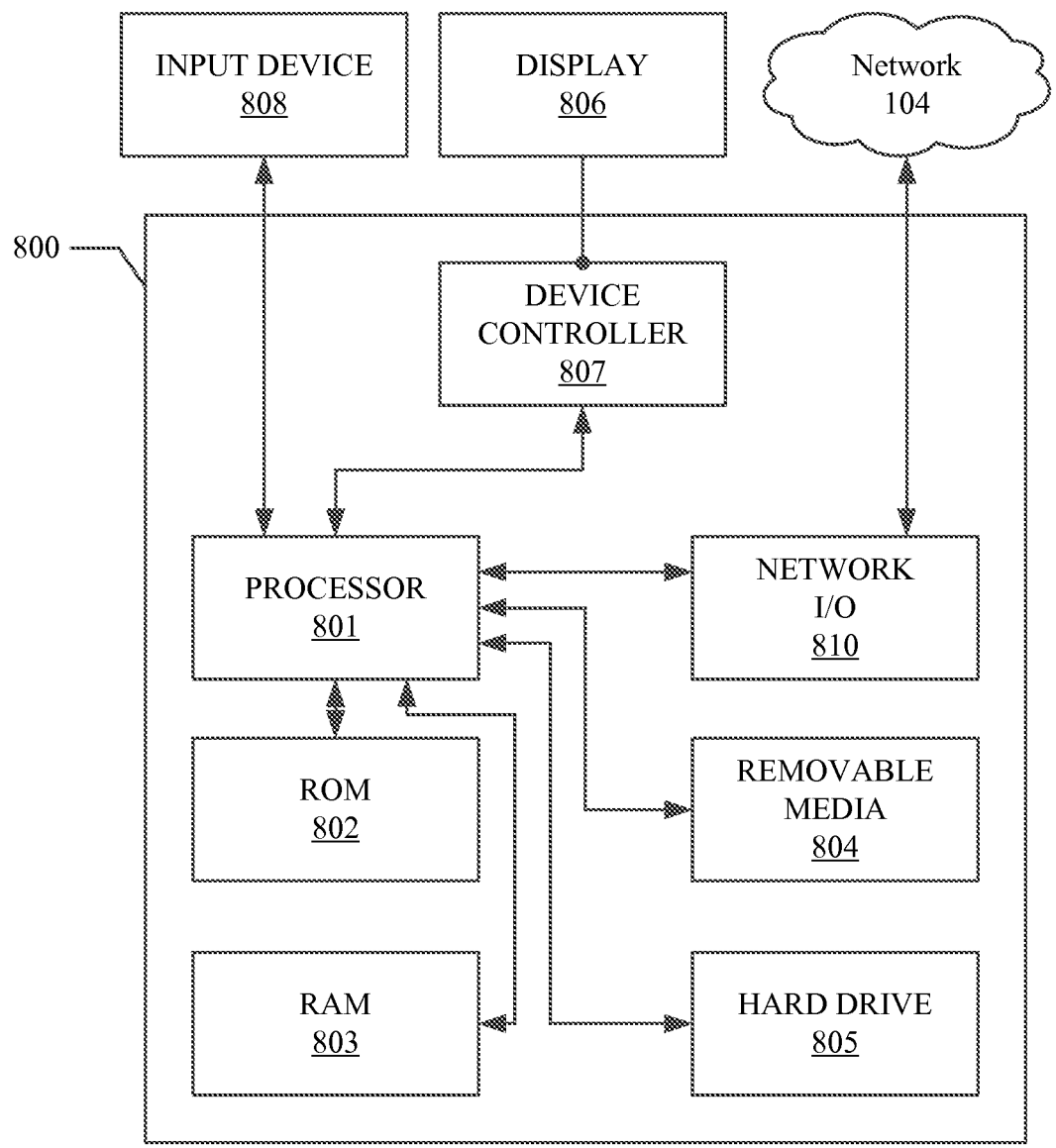
FIG. 8 illustrates example software and hardware device on which various elements described herein can be implemented in accordance with example embodiments.

FIG. 8 illustrates general hardware elements and software elements that can be used to implement any of the various computing devices and/or software discussed herein. Device 800 may include one or more processors 801, which may execute instructions of a computer program to perform any of the functions and steps described herein. The instructions may be stored in any type of computer-readable medium or memory to configure the operation of the processor 801. For example, instructions may be stored in a read-only memory (ROM) 802, random access memory (RAM) 803, removable media 804, such as a Universal Serial Bus (USB) drive, compact disk (CD) or digital versatile disk (DVD), hard drive, floppy disk drive, or any other desired electronic storage medium. Instructions may also be stored in hard drive 805, which may be an internal or external hard drive.

Device 800 may include one or more output devices, such as a display 806, such as an external monitor or television, and may include one or more output device controllers 807, such as a video processor. In some embodiments, device 800 may include one or more user input devices 808, such as a remote control, keyboard, mouse, touch screen, microphone, or any other input device.

Device 800 may also include one or more network interfaces, such as network input/output (I/O) interface 810 to communicate with network 104. The network interface may be a wired interface, wireless interface, or a combination of the two. In some embodiments, network I/O interface 810 may include a cable modem, and network 104 may include the communication links 101 shown in FIG. 1, one or more networks 104, an in-home network, a provider's wireless, coaxial, fiber, or hybrid fiber/coaxial distribution system (e.g., a DOCSIS network), or any other desired network.

The various features described above are merely non-limiting examples, and can be rearranged, combined, subdivided, omitted, and/or altered in any desired manner. For example, features of the servers can be subdivided among multiple processors and computing devices.

Any of the above-mentioned functional components may be implemented with at least one processor and at least one memory. The functional components may include hardware that may execute software and/or be configured in hardware to perform specific functions. The software may be stored on a non-transitory computer-readable medium in the form of computer-readable instructions. A computer may read those computer-readable instructions, and in response perform various steps as defined by those computer-readable instructions. Thus, any functions attributed to any of the components of FIG. 1 as described herein may be implemented, for example, by reading and executing such computer-readable instructions for performing those functions, and/or by any hardware subsystem (e.g., a processor) from which the computer is composed.

While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

What is claimed is:

1. A first back end device comprising:
one or more processors; and
memory storing instructions that, when executed by the one or more processors, cause the first back end device to:
establish a network connection with a client device;
receive, from the client device and via the network connection, a content request comprising a content identifier;
send, to a front end device, the content identifier;
receive, from the front end device, a network address of a second back end device;
send, to the second back end device, the content identifier and state data associated with the network connection; and
instruct the second back end device to service the content request,
wherein the first back end device, the front end device, and the second back end device are associated with a cache cluster.

2. The first back end device of claim 1, wherein the state data comprises transmission control protocol state data.

3. The first back end device of claim 1, wherein the content request comprises a Hypertext Transfer Protocol (HTTP) request and a virtual network address associated with the cache cluster.

4. The first back end device of claim 1, wherein the first back end device, the second back end device, and the front end device each share a same virtual network address.

5. The first back end device of claim 1, wherein the memory stores network addresses for each device associated with the cache cluster.

6. A method comprising:
establishing, via a first device, a network connection with a client device;
receiving, from the client device and via the network connection, a content request comprising a content identifier;
sending, to a second device, the content identifier;
receiving, from the second device, a network address of a third device;
sending, to the third device for initiating a transmission control protocol (TCP) handoff, the content identifier and state data associated with the network connection; and
instructing the third device to service the content request,
wherein each of the first device, the second device, and the third device are associated with a cache cluster and capable of responding to the content request.

7. The method of claim 6, wherein the receiving the content request comprises receiving a Hypertext Transfer Protocol (HTTP) request.

8. A method comprising:
establishing a network connection with a first device;
receiving, from the first device and via the network connection, a content request comprising a content identifier;
sending, to a second device, the content identifier;
receiving, from the second device, a network address of a third device;
sending, to the third device;
state data associated with the network connection; and
the content request; and
instructing the third device to service the content request.

9. The method of claim 8, wherein the second device and the third device share a virtual network address and wherein the receiving the content request comprises receiving the content request via the virtual network address.

10. The method of claim 8, wherein the instructing comprises instructing the third device to service the content request via one of the network connection or a virtual network address.

11. The method of claim 8, wherein the receiving the content request comprises receiving a Hypertext Transfer Protocol (HTTP) request.

12. The method of claim 6, further comprising receiving utilization information from each of the first device, the second device, and the third device, wherein the network address of the third device is determined based on the utilization information.

13. The first back end device of claim 1, wherein the instructions, when executed by the one or more processors, cause the first back end device to:
establish the network connection by establishing, using a virtual network address, the network connection; and
instruct the second back end device by instructing the second back end device to service, using the virtual network address, the content request.

14. The method of claim 6, further comprising:
receiving, by any one of the first device, the second device, or the third device and from a fourth device, a content item associated with the content request; and
storing a local copy of the content item.

15. The first back end device of claim 1, wherein the content request is a first content request comprising a first content identifier received at a first time, and wherein the instructions, when executed by the one or more processors, further cause the first back end device to:
receive, at a second time, a second content request; and
service the second content request.

16. The method of claim 8, wherein the content request is a first content request comprising a first content identifier received at a first time, the method further comprising:
receiving, at a second time, a second content request; and
servicing the second content request.

17. The first back end device of claim 1, wherein each of the first back end device, the front end device, and the second back end device is capable of responding to the content request.

18. The method of claim 8, wherein each of the second device and the third device are capable of responding to the content request.

19. The method of claim 6, wherein the establishing the network connection or the sending the state data comprises establishing the network connection via using transmission control protocol (TCP).

20. The method of claim 6, wherein the content request is a first content request comprising a first content identifier received at a first time, the method further comprising:
receiving, by the first device and at a second time, a second content request; and
servicing, by the first device, the second content request.

* * * * *

UNITED STATES PATENT AND TRADEMARK OFFICE
CERTIFICATE OF CORRECTION

| | | |
|---|---|---|
| PATENT NO. | : 11,601,376 B2 | Page 1 of 1 |
| APPLICATION NO. | : 13/828372 | |
| DATED | : March 7, 2023 | |
| INVENTOR(S) | : Johns et al. | |

It is certified that error appears in the above-identified patent and that said Letters Patent is hereby corrected as shown below:

In the Claims

Column 10, Claim 19, Line 58:
After "comprises", delete "establishing the network connection via"

Signed and Sealed this
Seventh Day of May, 2024

*Katherine Kelly Vidal*

Katherine Kelly Vidal
*Director of the United States Patent and Trademark Office*